United States Patent
Lauro et al.

(10) Patent No.: US 6,912,229 B1
(45) Date of Patent: Jun. 28, 2005

(54) METHOD FOR ALLOCATING/SHARING RESOURCES AMONG SEVERAL OF A COMMUNICATION NETWORK SUBSCRIBERS

(75) Inventors: Sylvain Lauro, Paris (FR); Jean-Laurent Plateau, Sceaux (FR)

(73) Assignee: Alcatel, Paris (FR)

( * ) Notice: Subject to any disclaimer, the term of this patent is extended or adjusted under 35 U.S.C. 154(b) by 831 days.

(21) Appl. No.: 09/763,350

(22) PCT Filed: Jun. 30, 2000

(86) PCT No.: PCT/FR00/01862
§ 371 (c)(1),
(2), (4) Date: Feb. 21, 2001

(87) PCT Pub. No.: WO01/03345
PCT Pub. Date: Jan. 11, 2001

(30) Foreign Application Priority Data
Jul. 2, 1999 (FR) .......................................... 99440174

(51) Int. Cl.[7] .............................. H04J 3/16; H04B 7/26; H04L 12/56; H04Q 7/38
(52) U.S. Cl. ....................................... 370/465; 370/468
(58) Field of Search ................................ 370/465, 468; 455/452.1, 452.2

(56) References Cited

U.S. PATENT DOCUMENTS

| | | |
|---|---|---|
| 4,792,944 A | 12/1988 | Takahashi et al. |
| 5,881,049 A | 3/1999 | Beshai et al. |
| 2002/0159411 A1 * | 10/2002 | Airy et al. ................... 370/330 |
| 2004/0067756 A1 * | 4/2004 | Wager et al. ................ 455/450 |
| 2004/0081091 A1 * | 4/2004 | Widmer et al. ............. 370/230 |
| 2004/0093326 A1 * | 5/2004 | Carson et al. .................. 707/3 |

FOREIGN PATENT DOCUMENTS

EP 0 913 970 A1 5/1999

OTHER PUBLICATIONS

T. Tokunaga, "Time–Division Multiplexing of Signals with Plurality of Information rates in Which Original Symbol Intervals of Individual Signals are Preserved", Electronics and Communications in Japan, US, vol. 53–A, No. 12, Dec. 1970, pp. 35–44; XP000797232.

Robert Sedgewick "Algorithms", 1992, Addison–Wesley (Deutschland) GMBH, Munchen XP002152408, p. 42.

* cited by examiner

*Primary Examiner*—Melvin Marcelo
(74) *Attorney, Agent, or Firm*—Sughrue Mion, PLLC

(57) ABSTRACT

In a network (201 to 204), the use of a resource (209) is optimized by managing access to it dynamically. Users access the resource only when they require it and it is released immediately afterwards. This is obtained by a hierarchy stored in a memory (207) in the form of a list of users organized as a function of the contracts they have entered into for access to the resource. The requirements of users for access to the resource are examined and serviced (200) regularly.

12 Claims, 3 Drawing Sheets

| N° | S1 | S2 | P1$_s$ | P1$_p$ | P2$_s$ | P2$_p$ | R |
|---|---|---|---|---|---|---|---|
| 1 | 16 | 0 | 6 | 1 | | | 40 |
| 2 | 8 | 8 | 8 | 2 | 2 | 2 | 5 |
| 3 | 0 | 16 | | | 4 | 3 | 10 |
| 4 | 0 | 16 | | | 4 | 3 | 28 |
| 5 | 64 | 0 | 5 | 5 | | | 56 |
| 6 | 16 | 0 | 7 | 1 | | | 12 |
| 7 | 16 | 0 | 7 | 6 | | | 30 |
| 8 | 8 | 0 | 8 | 2 | | | 2 |
| ⋮ | ⋮ | ⋮ | ⋮ | ⋮ | ⋮ | ⋮ | ⋮ |
| N | 0 | 0 | | | | | |

METHOD FOR ALLOCATING/SHARING RESOURCES AMONG SEVERAL OF A COMMUNICATION NETWORK SUBSCRIBERS

BACKGROUND OF THE INVENTION

The present invention relates to a method allocating/sharing resources among users of a communication network. The field to which the invention applies comprises all point-to-multipoint communication networks in which resources are shared. The resources to be allocated are principally transmission resources, for example channels defined by times, frequencies and/or physical communication nodes. Similarly, the invention can be transposed to the field of multitasking applications or multi-processor and multitasking applications. In the context of a multitasking environment, a processor is a central point at which the various processes are executed. In this case the resource is a processing resource. The object of the invention is to guarantee users optimum access to a resource without wasting the resource and to assure the various users the minimum quantity of resource to be provided under their contract. Another object of the invention is to provide a high-performance transmission service without having to overrate the transmission equipment.

In the prior art users can already enter into a contract to use a telecommunication network. There are two kinds of contract. A first kind guarantees a particular quantity of resource to users when they have logged onto the network, for example a particular bandwidth. When a user logs on, the network knows the maximum bandwidth and the number of users who have already logged on. The network determines whether the new user can log onto the network without exceeding the bandwidth. If so, the new user is permitted to log on with a given bandwidth. If not, the request to log on is refused and the user has no access to the network. In this case a user attempting to log on is allocated some of the bandwidth, i.e. some of the resource, until they log off. The resource allocated to the user during this period cannot be used by anyone else, even if the user is not actually using the resource himself while he is logged on. This situation is problematical because, although transmission resource is available, in the sense that it is not being used, there may be users who cannot log on.

The second prior art solution allows all users who request to log on to do so. The resource is then shared equally between all users who are logged on at the same time. If a large number of users log on, the resource collapses. Each user is allocated an equal fraction of the resource. As and when new users log,on, that fraction is reduced in size. The problem of the first situation is encountered again here. All users who have logged on are allocated a portion of the resource, which they do not necessarily make use of. Users who are making use of the resource have very little resource available to them. In the case of transferring data, the transmission bit rates are low. Taking the example of a resource consisting of a transmission channel with a total bit rate of 10 kbit/s, if 100 users are logged on, each is allocated a bit rate of 100 bit/s. The situation can arise in which 99 of the 100 users who have logged on have nothing to transmit but one user has 100 kbits to transmit. Transmission will then occur at 100 bit/s, even though there is nothing in transit on the remainder of the channel.

SUMMARY OF THE INVENTION

The invention solves these problems and guarantees users a minimum bit rate. The invention offers a periodic and contractual right of access to the resources made available. In accordance with the invention, users dynamically release resource for which they may have no use. The resource released in this way is then made available to other users who are in the process of communication. A distinction is therefore established between users who have logged on and users who are in the process of communication. To be in the process of communication, the user must have logged on and be in the process of transmitting data. However, a user who has logged on is not necessarily exchanging data. When he wishes to communicate, the user is allocated the contracted quantity of resources. That allocation follows a request from the user, who indicates at the same time as the request the quantity of data he has to transmit. Once the data has been transmitted, the resource is released.

If all the users who have logged on require to communicate at the same time, which is very improbable, the network may not be able to satisfy their requirement for the contracted bit rates. This problem does not last for very long, however. As calls terminate, resource is released and can be reallocated to users still in the process of communication or to users who have logged on and are indicating a new requirement to communicate. The inventors have discovered that this problem is rare because, although it is routine for many users to be logged on, it is less frequent for all the users who are logged on to be seeking to communicate at the same time and at the full bit rate.

The invention therefore provides a method of allocating transmission resources by a resource server in a telecommunication network linking users, in which method:

a connection time of a first network user is initialized, during which time this first user is able to use a transmission resource made available to him by the resource server of the network for transmitting data, and during a first communication time within said connection time the first user really does make use of the transmission resource made available to him by the resource server in order to transmit data, characterized in that:

the first user initially transmits to the resource sever information representative of a quantified data transmission requirement, and during the connection time, the resource server allocates to the first user communication times, as a function of the requirement transmitted by the first user.

BRIEF DESCRIPTION OF THE DRAWINGS

The invention will be better undo stood after reading the following description and examining the accompanying drawings. The drawings are provided by way of illustrative example only and are not limiting on the invention. In the figures.

DETAILED DESCRIPTION OF THE INVENTION

For simplicity, the following description refers to resources to be allocated that take the form of existing transmission channels in a network having a fixed maximum bit rate. The resources between two points of the network can nevertheless include different types of channels with different bit rates. Users enter into a contract to obtain access to the above type of transmission channels and to be able to transmit information. In this example users can choose one of two services enabling them to access the transmission channel. A first service guarantees a minimum bit rate. A second service provides access to the resource depending on what is available, and with a guaranteed bit rate. A user can therefore enter into a contract for the first and/or the second service. The network recognizes and accepts users who have entered into a contract when they attempt to log onto the network.

According one essential feature of the invention, after a user has logged on, if that user wishes to transmit data, he sends a request indicating the quantity of data that he wishes to transmit. That information is included in the header of the data message that the user transmits to the network, for example. Alternatively, the request precedes transmission, which is effected afterwards synchronously with a transmission instruction sent by a transmission server of the network. In response to the request, the user is allocated a quantum of the available resource corresponding to his contract.

Figure 1:
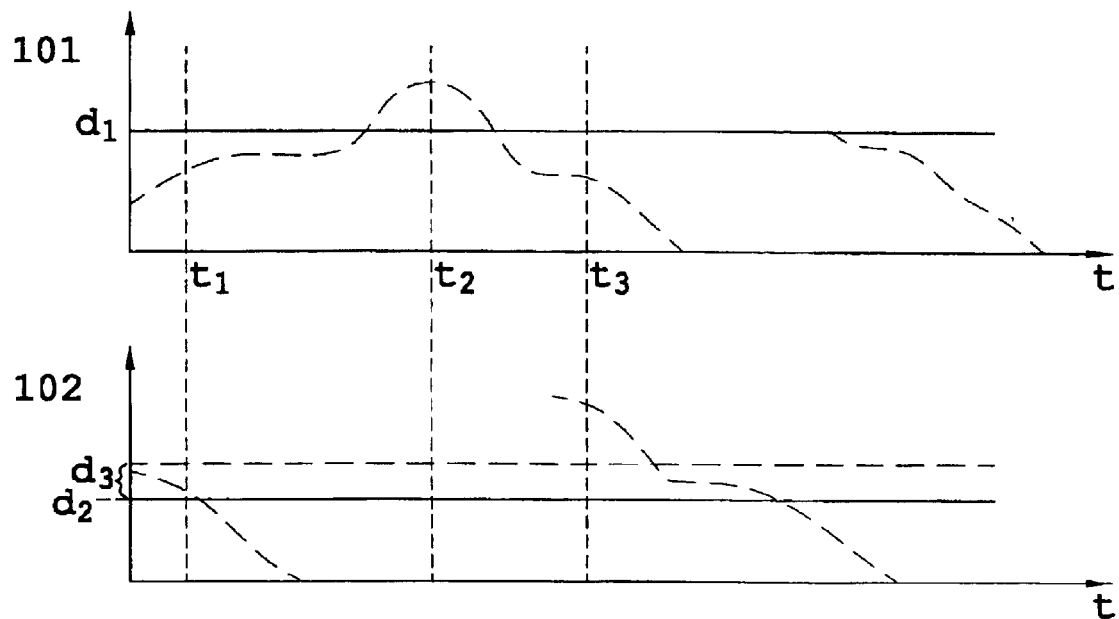
FIG. 1 is an illustration of the requirements of a user in terms of resources as a function of time.

FIG. 1 shows two graphs with time plotted on the abscissa axis and the resource requirement plotted on the ordinate axis. A first graph 101 concerns a first user and a second graph 102 concerns a second user. The first user has entered into a contract which gives him the right to a guaranteed bit rate $d_1$. The second user has entered into a contract which gives him the right to a guaranteed bit rate $d_2$. The second user has also entered into a second contract which gives him the right to an optional maximum top-up bit rate $d_3$. At a time $t_1$, the first user has a resource requirement less than $d_1$ and is therefore serviced. The second user has a resource requirement greater than $d_2$ but less than $d_2+d_3$. He is therefore serviced up to the $d_2$ level, regardless of what else is happening, and up to his total requirement if sufficient transmission resources remain in the network. At a time $t_2$ the first user has requirements greater than $d_1$ and the second user has no resource requirement at all. The first user is serviced up to the $d_1$ level. The difference between his real requirements and the $d_1$ level is transferred to future requirements.

To this end time is divided into cycles. Each cycle includes a particular number of time slots. The requirements and the rights of users are expressed as a number of slots per cycle. In the invention the requirements of users are evaluated and serviced periodically. If the requirements of a user exceed his rights at any time, those requirements are carried forward and taken into account the next time his requirements are examined.

At a time $t_3$ the first user has requirements less than $d_1$ and is therefore serviced. The second user has requirements greater than $d_2+d_3$, and is therefore serviced up to the $d_2$ level, or up to the $d_2+d_3$ level if there are sufficient resources. Requirements exceeding $d_2+d_3$ are examined later.

Figure 2:
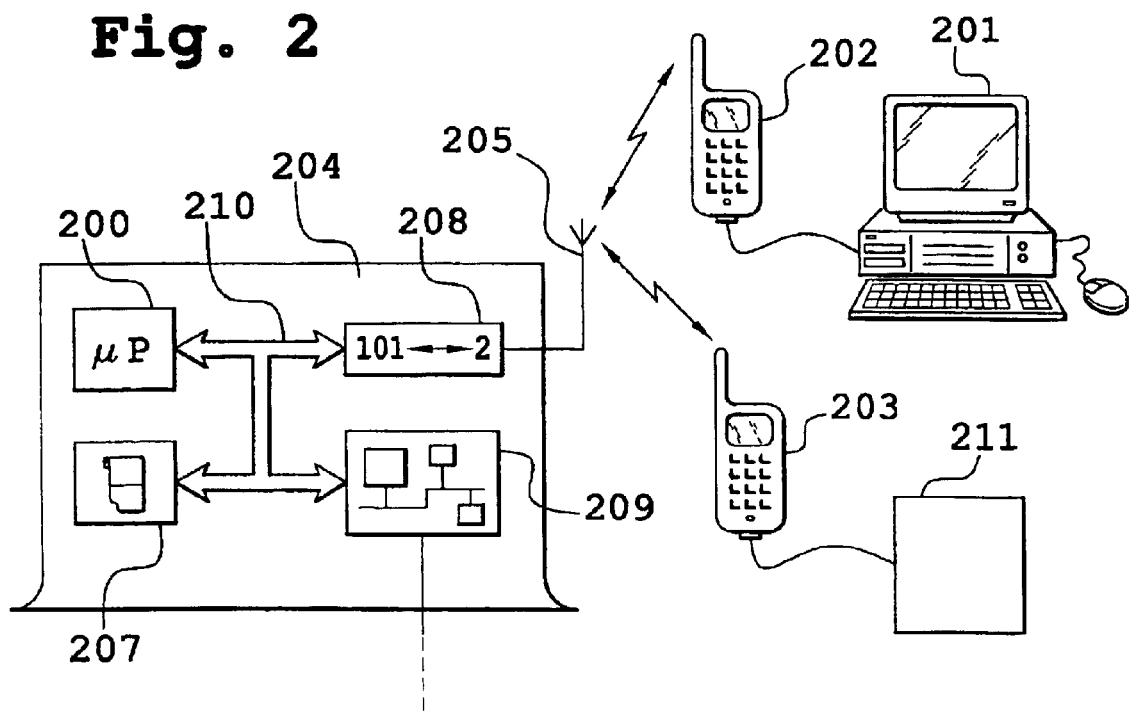
FIG. 2 shows a device for implementing the invention.

FIG. 2 shows a system including the elements needed to implement the invention. FIG. 2 shows an office computer 201. The computer 201 is connected to a mobile telephone 202 by a serial cable link. Another mobile telephone 203 is connected by a serial cable link, for example, to another unit 211 that can exchange data with it. The telephones 202 and 203 have logged onto a base station 204 via an antenna 205. In practice the aim is to set up a radio link between the computer 201 and a base station 204. The situation is the same as that of a network in which the telephones 202 and 203 are terminals and the base station 204 is a gateway to a high bit rate line, for example.

The base station 204 contains a microprocessor 200, a memory 207, a modem (modulator-demodulator) 208, and an interface 209 to a network having a given bit rate. The memory 207 and the memory of the computer 201 contain programs which implement the method of the invention. The memory 207 also contains information on the users of the network. The units 200 and 207 to 209 are connected by a bus 210. The microprocessor 200 can read and write the memory 207.

Figures 3, 4:
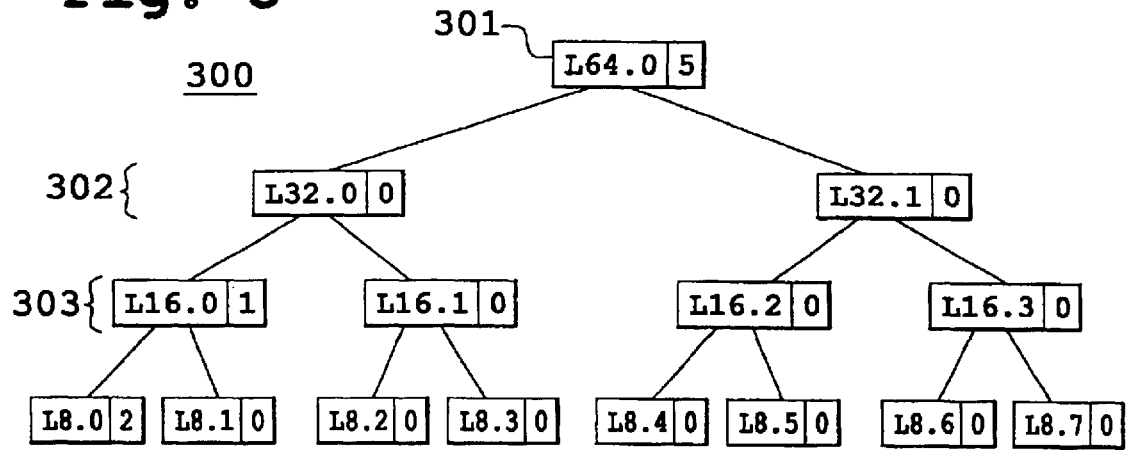
FIG. 3 shows a hierarchy of users based on their contracts.
FIG. 4 is a table containing information about users.

FIG. 3 shows the hierarchy of the users of a service. The users are grouped into lists according to their contracts and the lists are chained in a balanced binary tree. A tree is made up of a root, nodes and leaves. The root is the lowest level node and the leaves are the highest level nodes, i.e. the depth of the tree minus 1. The other nodes constitute intermediate levels. In a balanced binary tree each level has a number of nodes equal to $2^{\wedge}$ level. Because the lists are chained in a tree, a list is associated with each node of the tree.

Paths are then defined in the binary tree and the paths are scanned sequentially to satisfy the requirements of all users. In a preferred example there are four types of contract. A first type of contract guarantees the user access to the network at a bit rate of 64 kbit/s or more, a second type guarantees access at 32 kbit/s, a third type access at 16 kbit/s and a final type access at 8 kbit/s. A list of users of the first type, two lists of users of the second type, four lists of users of the third type and eight lists of users of the final type are created. List L64.0 is the list of users of the first type. Lists L32.0 and L32.1 are the lists of users of the second type. Lists L16.0 to L16.3 are the lists of users of the third type and lists L8.0 to L8.7 are the lists of users of the final type.

The list L64.0 is the root 301 of the tree 300. The first level 302 of the tree 300 consists of the lists L32.0 and L32.1. The second level 303 of the tree 300 consists of the lists L16.0 to L16.3. Finally, the leaves of the tree consist of the lists L8.0 to L8.7. Each list of the tree 300 corresponds to an address in the memory 207 of the base station 204 in which the number of the first user present in that list is stored.

TABLE 1

| | |
|---|---|
| Path 0 | L64.0→L32.0→L16.0→L8.0 |
| Path 1 | L64.0→L32.0→L16.0→L8.1 |
| Path 2 | L64.0→L32.0→L16.1→L8.2 |
| Path 3 | L64.0→L32.0→L16.1→L8.3 |
| Path 4 | L64.0→L32.1→L16.2→L8.4 |
| Path 5 | L64.0→L32.1→L16.2→L8.5 |
| Path 6 | L64.0→L32.1→L16.3→L8.6 |
| Path 7 | L64.0→L32.1→L16.3→L8.7 |

Scanning all the paths one after the other constitutes a ring. The frequency with which users appear in the ring is proportional to the level of their contract. Thus a user who has entered into a contract of the first type appears in the ring eight times more often than a subscriber who has entered into a contract of the final type. He is therefore serviced eight times more often. This indeed corresponds to his contract, since the contract of the final type corresponds to 8 kbit/s and 8 times 8 is indeed 64. Other paths can be defined, what counts being the frequency with which users appear in the ring formed by all of the paths.

In other embodiments of the invention the structure of the tree 300 can be enlarged. It is possible to envisage a third level, which would increase the number of contract types to 5. Similarly, it is possible to envisage the use of a tree that is not binary but ternary or quaternary, or of even higher order. However, it is known in the art that a tree of higher order than 2 can always be reduced to a second order tree. Thus the structure chosen and the depth of the tree represent a good compromise between the number of services offered and the time needed to implement the services correctly.

In practice the eight paths are stored in the memory 207 either in the form of a table or as a fragment of code and are defined by the tree concept. In one example, the tree is stored in the form of the Table 1, which has 32 locations. Each location corresponds to one list. A list is stored in the table under the number of the first user in the list.

FIG. 4 shows one example of storing the structure described with reference to FIG. 3. It shows a table 400 stored in the memory 207 of the station 204. The table contains lines which each correspond to one user. Each line contains several fields. A first field 401 corresponds to the number of the user. A second field 402 contains information relating to the user's contract, under which the first service guarantees the user a minimum bit rate. A third field 403 contains information on the contract, if any, for the second service, offering the user an optional top-up bit rate. Fields 404 to 407 are used to chain the user into the various lists previously described. Finally, a field 408 contains the user's instantaneous resource requirements.

The fields 404 and 405 relate to the first service. For a user X, the field 404 contains the number of the user following user X in the list in which user X appears. The field 405 contains the number of the user preceding user X in the list. If the field 404 is equal to the number of user X, then user X is the last user in the list. If the field 405 is equal to the number of user X, then user X is the first user in the list. The 1 fields 406 and 407 are identical to the fields 404 and 405 but for the second service. FIG. 4 shows that a user 1 has entered into a contract guaranteeing a bit rate of 16 kbit/s. Users 6 and 7 have entered into the same type of contract. There are no other users in the table who have entered into the same type of contract. The field 404 of user 1 therefore has the value 6. The field 404 of user 6 has the value 7 and the field 404 of user 7 has the value 7, which indicates that user 7 is the last user in the list. Like the field 405 of user 1, the field 405 of user 6 has the value 1 and the field 405 of user 7 has the value 6. The FIG. 4 table is provided by way of example. In practice an attempt is made to harmonize the lengths of the paths and therefore to balance the lengths of the lists. This enables staggered resource allocation.

This table structure has many cumulative advantages. First of all, it provides a simple way to manage the lists required by the invention. It is sufficient to manage as many 404 and 405 type fields as there are lists of users. Also, direct access to the information in the table 400 relating to a user can be obtained merely by calculating an address. The size of a line and the number of the user are known. The information concerning the user is accessed by multiplying the size of a line by the number of the user and adding the result to the base address of the table 400 in the memory 307. The chained list structure speeds up the process of inserting users into the various lists and removing them, as all that is required is to update the fields concerned. Finally, with the chosen structure the lists can be scanned in both directions. This speeds up the process, in particular when it is necessary to look for a user preceding another user. In practice a structure of the above type relating to 2000 users requires fewer than 64 kbytes.

In practice at least part of the table 400 is contained in a two-port memory. The table 400 is updated when a user expresses a requirement and read continuously to service the requirements of users. The two-port memory enables these two tasks to co-operate asynchronously, with each task using one port to access the data contained in the table 400.

In practice there is at least one other list, that of users who have logged on but have zero current requirements. This is the list of users referred to as users maintaining their connections.

Figure 5:
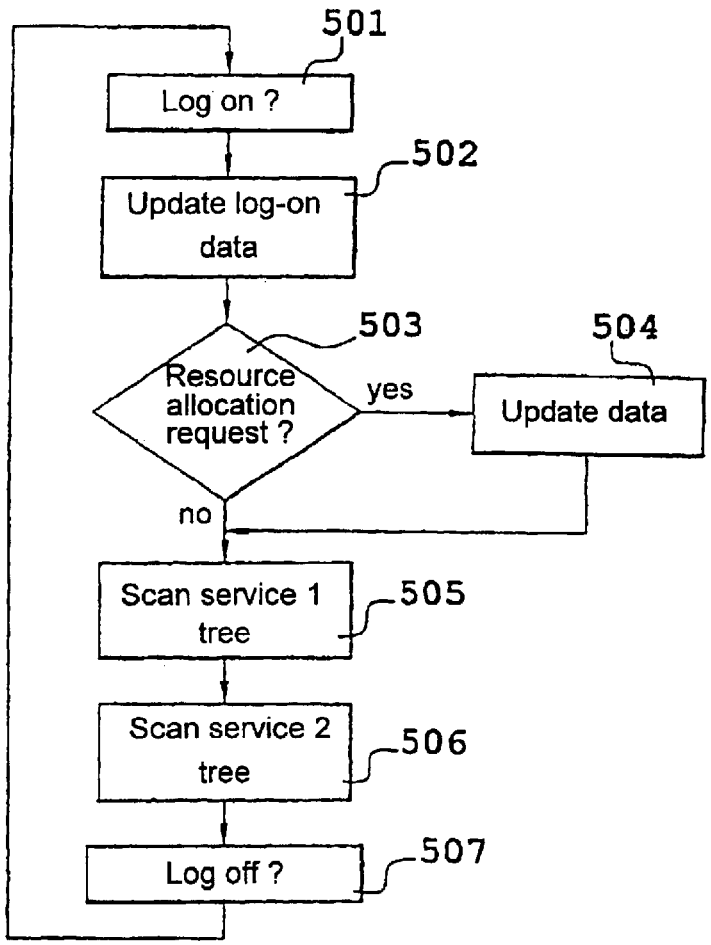
FIG. 5 shows the steps of a method of the invention.

FIG. 5 shows a preliminary connection step 501 in which a user announces that he may require to use resources. The next step 502 updates the logging on data. During step 502 the microprocessor 200 updates the appropriate fields in the table of users under the control of a program stored in the memory 207. The microprocessor can also decide to refuse the request to log on if it decides that the risk of congestion of the resource is too high. That risk is measured by totaling the first service contracts, which correspond to a guaranteed bit rate. If the guaranteed bit rate exceeds the available bit rate by too much, it becomes prudent to refuse new connections which also provide a guaranteed bit rate.

A user who has just logged on is initially in a list of connection-maintaining users. In other words the user has logged on but has not yet stated his requirements or has no requirements. In an alternative implementation of the invention the user states a requirement as soon as he logs on. In this case the user is inserted directly into a list appropriate to his requirement. The next step 503 requests allocation of resources. During this step the microprocessor receives and processes requests from users who have logged on. Those requests arrive either via a signaling channel or by "piggybacking", which entails inserting signaling information into data frames. Since signaling is not constant this economizes resources.

A preferred implementation of the invention uses a low bit rate signaling channel. Each user, whether he has logged on or not, is allocated a time slot on the signaling channel every 500 milliseconds. The user uses the low bit rate signaling channel when he logs on to initiate dialogue with the server and state his first requirement. Afterwards the bit rate of the signaling channel is increased by "piggybacking". Increasing the signaling bit rate enables the server to respond more adequately to the requirements of the user, which can be stated more frequently. This smoothes the flow of data from the user to the server. To preserve this advantage, a time slot is allocated to a user who has logged on even if he has not stated a requirement. This preserves a high level of responsiveness to any possible demand.

In an implementation of the invention user 2 requires five time slots to send data. The microprocessor therefore updates field 408 of the line corresponding to user 2. It increments that field with the digit 5. This is the step 504 of updating the data. Whether there has been an allocation request or not, a step 505 which scans the service 1 tree is executed regularly. In a different implementation of the invention, the user states his requirement each time that he sends data. In this case, the field 408 is not incremented with a new requirement but updated with the stated requirement.

When a user expresses a requirement, he is inserted into the lists corresponding to his contract(s). In other words, and still in the case of subscriber 2, he is inserted into a list corresponding to service 1 and to a contract guaranteeing a bit rate of 8 kbit/s. However, he is also entered into a list corresponding to the second service and guaranteeing him an optional top-up bit rate of 8 kbit/s. The user is inserted into a list either by means of an insertion pointer or by scanning the tree to find the best position at which to insert the user. The insertion pointer is updated on each new insertion, and this is therefore the quickest method, but is greedier in terms of memory occupancy. The aim of the operation is for each path to have substantially the same length in terms of the number of users. An item is inserted into a chained list in a manner that is known in the art.

The step 505 always begins by scanning the list L64.0. Users with the highest level contract are always serviced first. In the chosen example, as shown in FIG. 4, the list L64.0 contains only one user, namely user 5, who requires 56 time slots. For purposes of explanation a frame containing 100 time slots is considered. A cycle contains eight frames. A first type contact gives the right to eight time slots per cycle, a second type contract to four time slots per cycle, a third type contract to two time slots per cycle and, finally, a final type contract to one time slot per cycle. If CDMA coding is used, the number of slots per cycle is managed simultaneously with the number of codes per cycle.

User 5 is therefore allocated a time slot in the first frame. Along the path 0 the next list is the list L32.0, which is empty. The next list is the list L16.0, which begins with user 1. User 1 is therefore allocated one time slot in the frame, followed by users 6 and 7 who are also allocated one time slot each in the frame. The next list is the list L8.0, which begins with user 2. Users 2 and 8 are also allocated one time slot each in the frame. Scanning the tree corresponding to service 1 is halted either at the end of a path or if the capacity of a frame is exceeded. It is therefore certain either that users will be serviced in accordance with their contractual guarantee or that congestion management will be optimized.

On the next pass of step 505, the tree 300 is scanned along the path 1, then on the next pass along the path 2, and so on, up to path 7. The cycle then resumes with path 0.

Step 505 is followed by a step 506 which scans the service 2 tree. The tree is not shown but is similar to the service 1 tree. It is scanned slightly differently, however. Users who are present in the service 2 tree are serviced only if time slots remain available in the frame. Users present in the service 2 tree are therefore serviced if there are free time slots in the frame. Scanning is naturally interrupted if it is found that there is no stated requirement in the service 2 tree.

As the stated requirements of users are serviced, the fields 408 corresponding to those users are updated in the service 1 tree or the service 2 tree.

The next step is a step 507 in which, the microprocessor 200 studies requests to log off. A user who wishes to log off is withdrawn from all the lists in which he is present. The user is withdrawn from the lists by updating the pointers 404 to 407. If user 6 in FIG. 4 wishes to log off, for example, the value of the fields 404 and 405 corresponding to user 6 are erased, after updating the field 404 of user 1, i.e. after allocating him the value 7, and after updating the field 405 of user 7, i.e. after allocating him the value 1. Erasure therefore amounts to assigning the value of the field 404 of the user who is to be removed to the field 404 of the preceding user and assigning the value of the field 405 of the user who is to be removed to the field 405 of the following user. It is of course necessary to detect the situation in which the first or last user in a list wishes to log off. For this it is sufficient to test the values 404 and 405 and to compare them to the user's number. If the field 405 is equal to the number of the user, then the user is the first in the list. For that user to log off it is then sufficient to assign to the field 405 of the second user in the list the value of the second user in the list. If it is the last user in the list who wishes to log off, it is sufficient to assign to the field 404 of the penultimate user in the list the number of the penultimate user in the list. Of course, if the user who wishes to log off is the only one in the list, it is sufficient to erase fields 404 and 405. In the last three situations referred to, updating the memory areas containing the numbers of the first users in the lists must not be overlooked.

Once a frame has been constructed, i.e. every 5 ms, for example, it is transmitted by the microprocessor 200 to the interface 209 which then sends it to the network. The microprocessor 200 uses the modem 208 and the antenna 205 to send radio messages, for example, which inform the computer 201, via the telephone 202, of the number of time slots available to it in the next frames scheduled to leave. Having that information, the computer 201 can transmit the information corresponding to the number of time slots that have been allocated to it. That information is sent via the telephone 202, received via the antenna 205, demodulated by the modem 208 and placed in the frames by the microprocessor 200.

Figure 6:
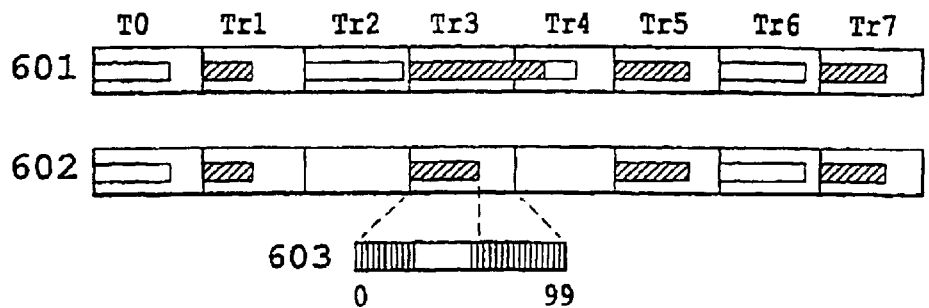
FIG. 6 shows an implementation of a method of the invention.

FIG. 6 shows a first cycle 601 and a second cycle 602. The third frame of the cycle 602 is further broken down. A frame 603 is made up of 100 time slots, for example, numbered from 0 to 99. During cycle 601 frames 0, 1, 2 are sufficient to service the requirements of users without any congestion. During frame 3 the requirements corresponding to guaranteed bit rates exceed the capacity of the frame, which is the situation referred to as congestion, meaning that the network is no longer able to satisfy the requirements of users. Scanning the tree corresponding to service 1 in the current path is therefore interrupted when the capacity of the frame (100 time slots) is reached. In frame 4, corresponding in theory to scanning the next path, scanning is resumed where it was interrupted in the path corresponding to frame 3. The path corresponding to frame 4 is then scanned.

The cycle 602 illustrates a situation in which there is very little congestion in the cycles and some frames are even empty.

In practice a congestion rate is measured which corresponds to a number of consecutive frames for which it has not been possible to satisfy the requirements of users present in the paths corresponding to those frames. If the congestion rate becomes too high, and if there is still room in a frame, the decision can be taken to scan more than one path to fill that frame. This reduces the congestion rate.

This method of managing congestion enables users to continue to be serviced in proportion to their contract, even if the contract is not fulfilled totally. This is satisfactory because it is based on the hypothesis that congestion will not be frequent, so that users will not be unduly disadvantaged and will not realize that they are disadvantaged.

In practice the method described is hardwired, i.e. implemented in the form of an electronic circuit. It is necessary to respond to the requirements of 2000 users and to examine their requirements every 5 ms. A pure software solution can be employed when sufficiently powerful microprocessors become available or in applications with less severe timing constraints.

The foregoing description refers to only two types of service but in practice there can very well be only one service or more than two services.

What is claimed is:

1. A method of allocating transmission resources (209) by a resources server (204) in a telecommunication network (202–204) connecting users (202, 203), characterized in that:

users who have logged on are classified into classes representative of their contracts or the services for which they have contracted, a transmission resource is allocated to each user who is in the process of communication in compliance with the class of his contract or service, and the classes are organized in a scanning cycle, the frequency at which each class appears in said cycle following a geometrical progression.

2. A method according to claim 1, characterized in that a transmission resource is allocated to each user who is in the process of communication in compliance with the class of his contract or service and his requirement.

3. A method according to claim 1, characterized in that:

for classification, a table (400) is created including for each user:

reference field (401) relating to an identity of the user, a field (405) for designating a user to be serviced before that user, and a field (404) for designating a user to be serviced after that user, and available transmission resources are allocated to the various users in accordance with an order resulting from said table.

4. A method according to claim 3, characterized in that:

requirements of users are stored in a field (408) of the table, and the requirements of users are updated as and when they are stated and/or serviced.

5. A method according to claim 3, characterized in that the table is updated as and when network users start and stop communicating.

6. A method according to claim 1, characterized in that:

users who have logged on are divided into a plurality of lists representative of levels of resource allocation priority, said lists are organized into a binary tree (300) with a root node, intermediate nodes and final nodes referred to as leaf nodes, the depth of the tree is fixed, which defines a number of nodes and a number of paths, the root node is associated with a list of users with higher priority levels, on descending the tree, each intermediate node is associated with a list and the associated lists contain users with progressively lower priority levels according to the level of the node, the leaf nodes are each associated with a list and the lists associated with the leaf nodes contain users with lower priority levels, each path contains the root node, an intermediate node of lower level, an intermediate node of still lower level, and so on, and a leaf node, the binary tree is scanned from its root node to its leaf nodes and at each tree node encountered the associated list is scanned to allocate the resources to the subscribers in that list who have logged on, all the paths are scanned one after the other, and each node of a given level in the tree appears a number of times in the set of paths corresponding to its level, the number of paths in which is a power of 2.

7. A method according to claim 6, characterized in that:

communication time is divided into cycles (601, 602), each cycle is divided into frames, each frame is divided into time slots, and the resource is allocated in the form of a number of time slots per cycle.

8. A method according to claim 6, characterized in that the resource allocated is in the form of code.

9. A method according to claim 7, characterized in that:

a path of the tree of lists of users is scanned, resources corresponding to requirements of the users present in the lists of said path are allocated without the resources allocated being able to exceed one frame, if unallocated time slots remain at the end of scanning said path they are allocated to other users who have entered into contracts for lower priority services, and if the size of the frame is exceeded, the allocation requirements are transferred to a frame of a subsequent cycle.

10. A method according to claim 6, characterized in that the tree of list of users or a patch of that tree is scanned as long as an allocatable resource threshold is not reached.

11. A method according to claim 8, characterized in that the order of scanning the lists of users in a table contained in memory is stored.

12. A resource allocation system characterized in that it includes means for implementing a method according to claim 1.

* * * * *